United States Patent
Yribarren et al.

(10) Patent No.: US 6,415,589 B1
(45) Date of Patent: Jul. 9, 2002

(54) REMOTELY OPERABLE MOTORIZED DOFFER ADJUSTMENT ASSEMBLY

(76) Inventors: Richard J. Yribarren, 4308 James Rd., Tranquility, CA (US) 93668; Travis R. Yribarren, 12 Avila St., San Mateo, CA (US) 94402

( * ) Notice: Subject to any disclaimer, the term of this patent is extended or adjusted under 35 U.S.C. 154(b) by 0 days.

(21) Appl. No.: 09/680,987

(22) Filed: Oct. 6, 2000

(51) Int. Cl.$^7$ .............................................. A01D 46/18
(52) U.S. Cl. ............................................... 56/41; 56/50
(58) Field of Search ............................. 56/28, 36, 41, 56/40, 48, 50

(56) References Cited

U.S. PATENT DOCUMENTS

| | | | |
|---|---|---|---|
| 2,660,852 A | 12/1953 | Paradise | |
| 2,664,688 A | 1/1954 | Nickla | |
| 2,930,177 A | 3/1960 | Hubbard | |
| 3,224,178 A | 12/1965 | Kennedy | |
| 3,292,352 A | 12/1966 | Shaw | |
| 4,190,209 A | * 2/1980 | de Buhr et al. | 241/101.7 |
| 4,742,672 A | 5/1988 | Osborn | |
| 4,819,415 A | 4/1989 | Engelstad et al. | |
| 5,014,502 A | 5/1991 | Richman, et al. | |
| 5,490,373 A | * 2/1996 | Davenport et al. | 56/41 |
| 5,557,911 A | * 9/1996 | Sanderson et al. | 56/41 |

* cited by examiner

Primary Examiner—Thomas B. Will
Assistant Examiner—Meredith C. Petravick
(74) Attorney, Agent, or Firm—Mark D. Miller

(57) ABSTRACT

A remotely controlled motorized assembly for adjusting the vertical position of the doffer support shaft in the harvesting units a cotton harvesting machine. The assembly is retrofittable for use on existing harvesting units of cotton harvesting machines the doffers of which are designed to be adjusted using a manual adjustment screw. The invention includes a motor which is attached to the harvesting unit, intermediate gears, and a special opening or collar which fits onto the head of the manual adjustment screw of the doffer support shaft. The motorized assembly allows automatic or semi-automatic adjustment of the doffer support shaft without opening the harvesting units or shutting down the harvesting machine, saving considerable time and energy and promoting safety. Bipolar motors may be employed to allow for adjustment in either direction. A microprocessor and sensors may also be employed for automatic monitoring and adjustment of the doffer support shafts.

22 Claims, 6 Drawing Sheets

REMOTELY OPERABLE MOTORIZED DOFFER ADJUSTMENT ASSEMBLY

BACKGROUND OF THE INVENTION

1. Field of the Invention

The present invention relates to cotton harvesting machines, and more particularly to a remotely operable motorized assembly for adjusting the vertical position of the doffer assembly of a cotton harvester relative to the picker spindles.

2. Description of the Prior Art

Conventional cotton harvesting machines include two or more harvesting units attached near the front of the machine. Each harvesting unit includes at least one vertically oriented picker rotor or drum and a corresponding doffer assembly. Each picker rotor includes a plurality of vertically spaced rows of rotatable cotton picker spindles. As the harvester moves through rows of mature cotton plants, the rotating spindles become entangled with and engage the cotton fibers removing them from the plant and winding them around the spindles. As the picker drum rotates, the spindles with cotton wound around them are brought into contact with the corresponding doffer assembly which strips the cotton from the spindles. The doffed cotton is then conveyed through and out of the harvesting machine.

The spindles of each picker rotor are typically arranged in a series of rows vertically spaced apart from each other. Each corresponding doffer unit includes a series or stack of vertically spaced doffer discs or plates with rubberized pads corresponding in number to the number of rows of spindles on the picker rotor. The doffer discs are mounted on a substantially upright rotatable shaft in spaced parallel relation to the picker rotor such that the doffer discs are intermeshed with the rows of spindles in closely spaced parallel relation. Proper operation of the harvester requires that the parallel positions of the doffer discs be maintained in order to avoid excessive rubbing the discs or pads against the spindles to minimize wear while at the same time maintaining a close enough position to insure complete doffing of the cotton from the spindles.

In most field conditions, the rubberized pads on the doffer discs must just touch the surface of the picker spindles for proper removal of harvested cotton lint from the spindles. Over time, the doffer pads are gradually worn away. Such worn pads do not efficiently remove cotton from the spindles affecting the overall operation of the harvester. Accordingly, periodic adjustment of the position of the shaft supporting the doffer discs and pads is required in order to maintain a proper spatial relationship between the spindles and the doffers for optimum operation of the harvester.

Typical adjustment of the doffer support assembly is accomplished manually either by changing the position of support elements below the doffer support shaft to change the position of the shaft such as is shown in U.S. Pat. Nos. 3,224,178 and 3,292,352; or by rotating an adjustment screw associated with the upper end of the doffer support shaft an example of which is shown in U.S. Pat. No. 5,014,502. Manual adjustment of the doffer support shaft is inefficient in that it requires shutting down the cotton harvester, opening the harvesting units, accessing the doffer adjustment mechanism and making the correct manual adjustments to the shaft to bring the doffer pads into proper spacing relative to the spindles. Not only is such manual adjustment difficult and time consuming, the same adjustment must be repeated on a plurality of doffer units (up to a dozen) at or about the same time. Any slight mis-adjustment or misalignment may result in uneven wear on the affected doffer unit thereby affecting the efficiency of the particular harvesting unit.

In response to these inefficiencies, certain automated doffer adjustment devices have been developed. The adjustment apparatus of U.S. Pat. No. 4,742,672 uses a hydraulic system associated with the upper end of the doffer support shaft to continuously adjust the position of the shaft and doffer pads relative to the spindles. However, this is a complicated and expensive design, and the hydraulic components thereof are subject to considerable maintenance problems. Another automatic doffer adjustment apparatus is disclosed in U.S. Pat. No. 4,819,415 which uses a specially threaded unit provided at the top of the doffer support shaft having an adjustment means for setting the difference between the upward and downward forces on the shaft in order to maintain the positioning of the doffer pads relative to the spindles. However, this design does not appear to have high reliability and requires trial and error adjustment.

It is therefore desirable to provide a reliable and inexpensive automatic or semiautomatic apparatus for adjusting the doffer support shafts of a cotton harvester.

SUMMARY OF THE INVENTION

The present invention overcomes the drawbacks of manual doffer support shaft adjustment while at the same time providing an automatic or semi-automatic apparatus that is more reliable and inexpensive than existing automatic doffer adjustment devices through the employment of a retrofittable remotely controlled motorized assembly for attachment to the manual adjustment screw of the doffer support shaft. The assembly of the present invention includes a remotely controlled electric gear motor designed to be operably associated with the manual adjustment screw of a doffer support shaft. The gear motor is attached to a mounting bracket in the housing above the doffer support shaft.

In one aspect of the invention, an interfacing gear is provided having a hexagonal, octagonal or other appropriately sized central opening for snug fitment over the head of the upper vertical adjustment screw for the doffer support shaft. A collar with set screw may also be provided on the gear for securing the gear to the adjustment screw. The electric gear motor is mounted to the upper housing supporting the doffer support shaft assembly and the interfacing gear is fitted over the vertical adjustment screw head such that the cogs of the interfacing gear intermesh with an outer gear of the gear motor. One or more intermediate gears are provided inside the gear box in order to facilitate an appropriate mechanical advantage and to provide the ability to make very fine adjustments to the interfacing gear on the adjustment screw. Operation of the electric motor moves the gears allowing for very fine adjustment of the upper adjustment screw relative to the upper housing allowing for very fine vertical adjustment of the doffer support shaft. Depending upon the number of intermediate or reducing gears used in the motor and their relative ratios, vertical adjustments in the range of 1/1000 inch are possible. Once operation of the motor is stopped, its internal parts are strong enough to resist any movement such that no vertical change in the position of the doffer support shaft can occur in the stopped position.

Because it is electric, the gear motor may be operated from a remote switch in the cab of the harvester while the harvester is in operation thereby avoiding the expenditure of time otherwise required for manual adjustment. A plurality of motors may be provided, one for each harvester unit of the machine. The controls may be established such that each of the motors may be operated independently, or the motors may be operated in groups (e.g. front/back, left/right, etc.), or all of the motors may be operated at the same time. The motor controls may be as simple as a single-direction pre-determined adjustment that is made to a given motor by activating a control switch. In such a situation, activating the switch causes the affected motor to operate for a predetermined (but adjustable) period of time making a pre-determined adjustment to the doffer support shaft. By way of example and for illustration purposes only, and without affecting the scope of the appended claims, a motor may be set to operate for a period of ten seconds which, according to the selected ratios of the gears of the motor, may result in a lowering of the doffer support shaft by 0.004 inch.

Alternatively, the motors may be connected to controls allowing for dual directional adjustment, with or without a pre-determined time setting. The controls may also be established such that the affected motor continues to operate as long as the user keeps the switch engaged, allowing for very slight or very significant adjustments to the corresponding doffer support shaft depending upon the length of time the motor is run.

In another aspect of the invention, the motor may be provided with an internal gear having the hexagonal, octagonal or other appropriate opening therein such that the motor assembly may be fitted directly over the vertical adjustment screw and mounted to the upper housing.

In another aspect of the invention, one or more sensors may be provided on each harvester unit in the vicinity of the spindles and doffer pads to monitor the wear on the pads. If excessive wear is detected, or if a visual gap is detected between the doffer and the spindle, the sensor(s) provide a signal to the user in the cab. The user may then cause an adjustment to be made to the affected unit until the sensor(s) indicate that the proper relationship has again been established. The sensor(s) may be adjusted in order to detect whatever amount of wear the operator desires to be reported.

In another aspect of the invention, the input from the sensors and the output to the adjustment motors may be controlled through a microprocessor or other computing unit so that adjustments may be automatically made in response to input from the sensors.

In operation, an adjustment motor assembly of the present invention is installed on each doffer assembly of the harvester by attaching the motor mount to the housing above the doffer support shaft. The gear or motor opening which corresponds with the doffer shaft adjustment screw is placed over the head of said screw. Wiring is installed to provide power to the motor using a control switch in the cab of the harvester. Depending on the aspect of the invention used, an adjustable timer may be provided with the control switch for each motor to provide power to the motor for an adjustable pre-set time, and/or the control switch may have dual polarity to allow adjustment in either direction. Activating the switch operates the motor which turns the gears and imparts rotational motion to the doffer support shaft adjustment screw. The motor mount prevents the motor itself from moving thus imparting the rotational movement directly to the screw. By turning the screw in one direction, the motor raises the doffer support shaft; by turning it in the other direction (by reversing the polarity to the motor) the motor lowers the shaft. The motor may be operated while the harvester is in operation, or when it is stopped, without the need to open or access the doffer and spindle assembly thereby saving time and avoiding potential injury to the operator.

In more advanced aspects of the invention, light or touch sensors may be deployed in the doffer assemblies to recognize when the doffer pads have become worn. When this is recognized, a signal is sent from the sensor to the cab to either alert the operator or a microprocessor that an adjustment to that doffer shaft should be made using the motorized adjustment apparatus of the present invention.

It is therefore a primary object of the present invention to provide a reliable, inexpensive remotely-controlledmotorized apparatus for adjusting the position of a doffer support shaft (and the doffer discs thereon) of a cotton harvesting machine.

It is another important object of the present invention to provide a retrofittable remotely-controlled motorized adjustment apparatus for attachment to the manual adjustment screw of a doffer support shaft of a cotton harvesting machine.

It is a further object of the present invention to provide a remotely-controlled motorized unit for adjustment of a doffer support shaft having a locking motor which prevents rotational movement unless the motor itself imparts such movement.

It is another object of the present invention to provide a remotely-controlled motorized unit for adjustment of a doffer support shaft having a plurality of gears for reducing the ratios between the motor shaft and the adjustment screw of the doffer support shaft for very fine adjustment of said screw.

It is another object of the present invention to provide a remotely-controlled motorized unit for adjustment of a doffer support shaft having an integral opening therein for fitment directly over the adjustment screw of the doffer support shaft.

It is another object of the present invention to provide a plurality of remotely-controlled motorized units for adjustment of each of the a doffer support shaft assemblies of a cotton harvesting machine.

It is another object of the present invention to provide a remotely-controlled motorized unit for adjustment of a doffer support shaft having an adjustable timer for establishing a pre-determined adjustment time for the operation of said unit.

It is another object of the present invention to provide a remotely-controlled motorized unit for adjustment of a doffer support shaft having a dual directional motor together with controls that allow operation of said motor in either direction.

It is another object of the present invention to provide a remotely-controlled motorized unit for adjustment of a doffer support shaft which includes sensors in the vicinity of the doffer support shaft which provide a signal to the operator or to a microprocessor when wear is detected on the doffer pads supported on said shaft such that an adjustment is made to the position of said shaft using said motorized unit.

Additional objects of the invention will be apparent from the detailed descriptions and the claims herein.

DETAILED DESCRIPTION OF THE PREFERRED EMBODIMENTS

Figure 1:
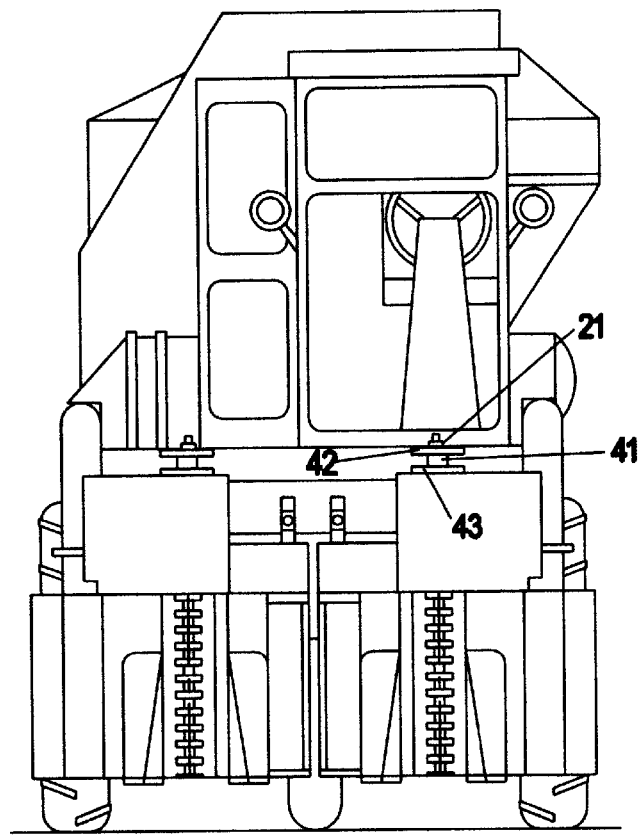
FIG. 1 is a front elevational view of a cotton harvesting machine showing the location of two frontal doffer assemblies.
Figure 6:
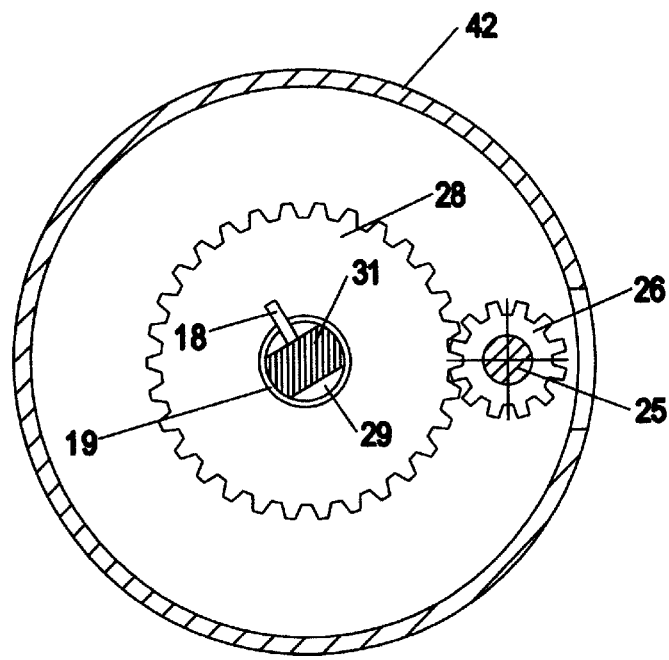
FIG. 6 is a cross-sectional view along line 6—6 of FIG. 2.
Figure 2:
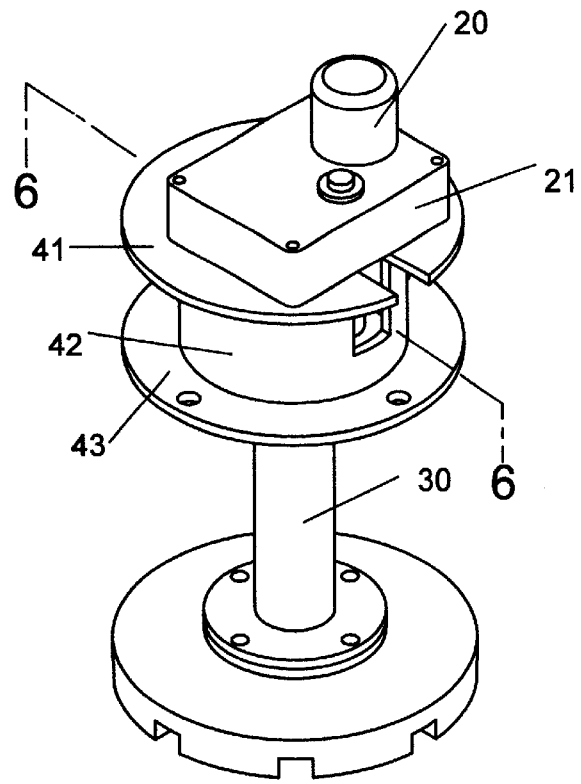
FIG. 2 is a perspective view of one embodiment of the motorized support assembly of the present invention for attachment to the top of the doffer support. shaft.
Figure 3:
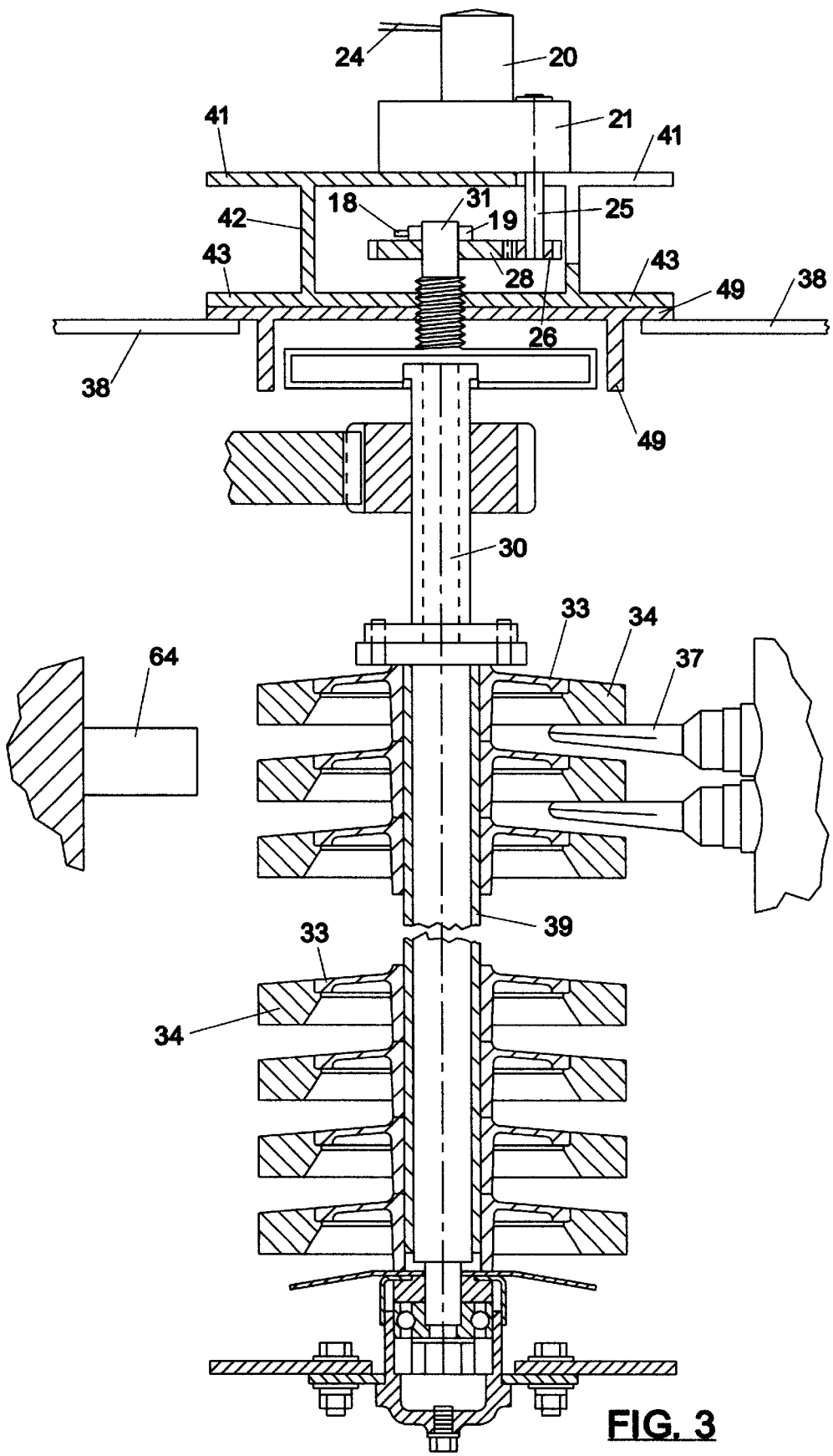
FIG. 3 is a cross-sectional view of a doffer support shaft assembly having the motorized assembly of FIG. 2 attached at the top thereof.

Referring to the drawings wherein like reference characters designate like or corresponding parts throughout the several views, and referring particularly to FIGS. 2 and 3 it is seen that the invention includes a motor 20 and a gear box 21 attached thereto. In the embodiment of FIG. 3, a motorzied shaft 25 protrudes out from box 21. Gear 26 is attached at the end of shaft 25. An interfacing (reducing) gear 28 having a specially formed opening 29 is provided adjacent to and interlocks with gear 26 as shown in FIG. 6. Opening 29 may be shaped to conform to the vertical adjustment screw 31 for the doffer support shaft 39 of the cotton harvester. Opening 29 may therefore have a square, hexagonal, octagonal or other suitable shape which conforms with the shape of screw 31. Alternatively, opening 29 and gear 26 may be provided with a collar 19 and set screw 18 for securely attaching gear 26 to screw 31.

In the embodiments of FIGS. 2 and 3, a cylindrical support housing 42 is provided having an upper plate or disc 41 and a lower plate or disc 43. Lower disc 43 is attached to the threaded doffer adjustment housing 49 which is attached to the housing wall 38 of the doffer assembly. Adjustment screw 31 is threaded through housing 49. Motor box 21 is attached to upper plate 41 as shown in FIG. 2. Shaft 25 and gears 26, 28 are deployed inside cylindrical housing 42. In use, rotation of motor 20 causes shaft 25 to rotate. This rotational motion is imparted to adjustment screw 31 through gears 26 and 28. As screw 31 is turned, it is threaded into or out of housing 49 which raises or lowers doffer support shaft 30, depending on the direction of rotation. Adjusting shaft 30 adjusts the positions of the doffer discs 33 and the doffer pads 34 attached to lower shaft 39 relative to the positions of the picker spindles 37. The amount of adjustment to shafts 30 and 39 depends upon how much rotation is imparted by motor 20, and the vertical direction of adjustment of shafts 30 and 39 (whether up or down) is determined by the direction of rotation provided by motor 20 (whether clockwise or counter-clockwise).

Figure 4:
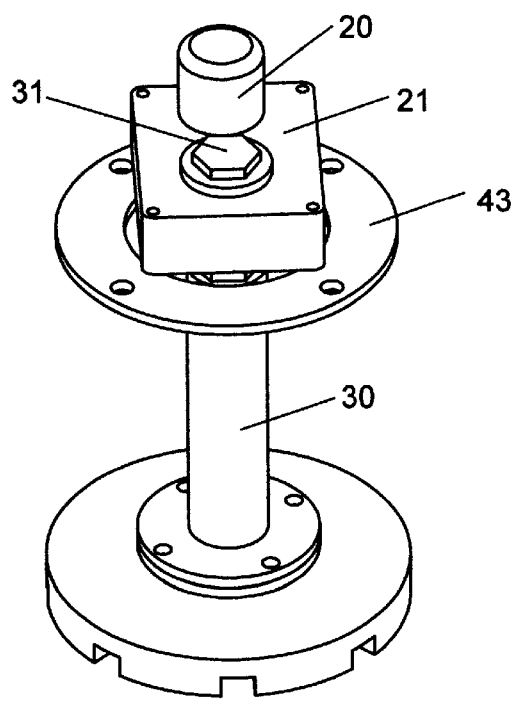
FIG. 4 is a perspective view of an alternative embodiment of the motorized support assembly of the present invention.
Figure 5:
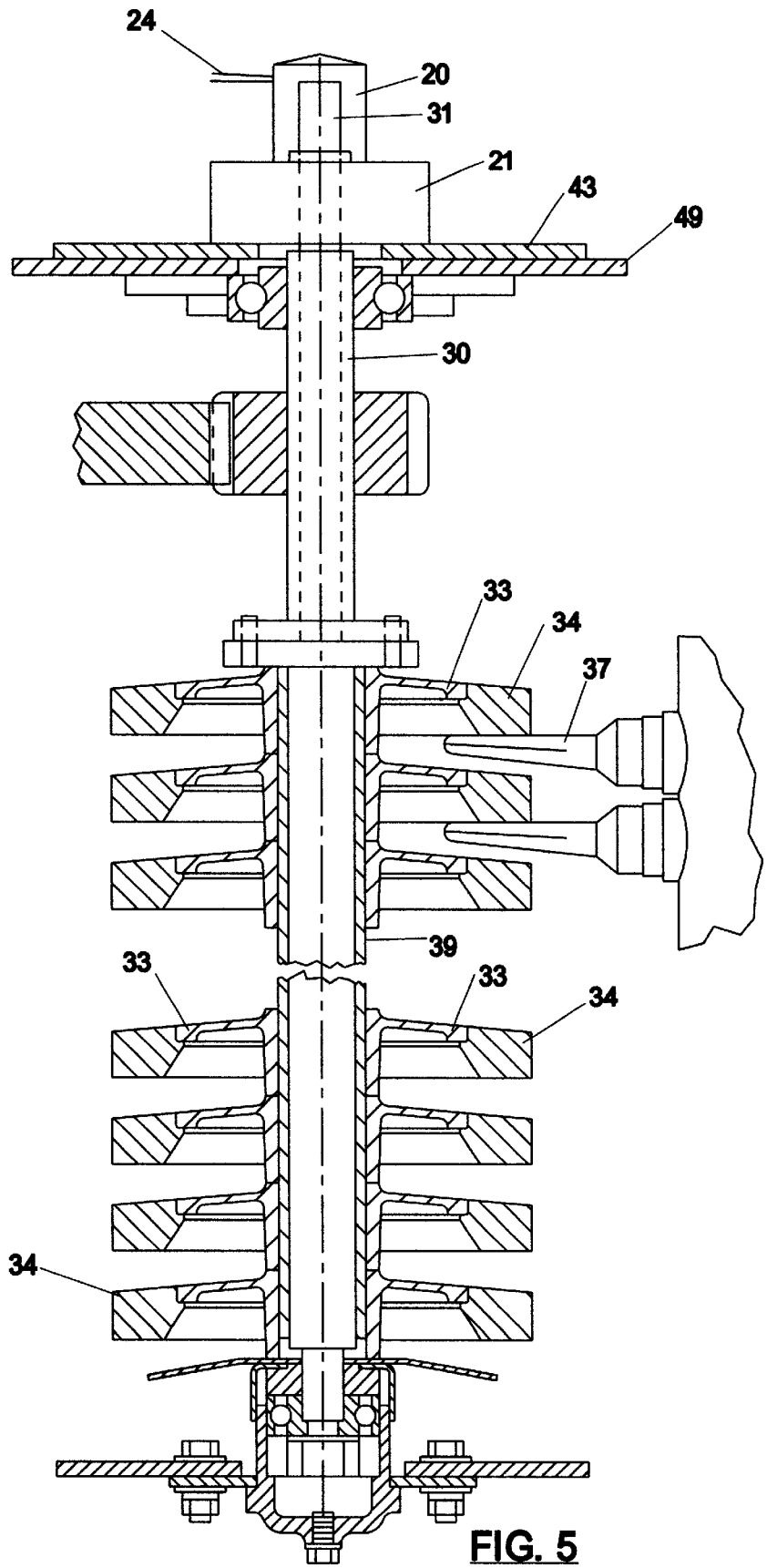
FIG. 5 Is a cross sectional view of a doffer support shaft assembly having the motorized assembly of FIG. 4 attached at the top thereof.

In the alternative embodiment of FIGS. 4 and 5, motor box 21 is provided with internal gears, the final motion-imparting gear having an opening 29 therein which conforms to the shape of adjustment screw 31. Opening 29 may therefore have a square, hexagonal, octagonal or other appropriate shape. Opening 29 is fitted directly over screw 31, thereby eliminating the need for housing 42 and upper disc 41, and also eliminating the need for shaft 25, and gears 26 and 28. Box 21 is attached directly to plate 43 which is attached to the threaded doffer adjustment housing 49. As with the previous embodiment, as rotational motion is imparted by motor 20, opening 29 fitted over screw 31 turns screw 31 in threaded housing 49 which raises or lowers the vertical position of doffer support shaft 39 according to the amount and direction of rotation imparted by motor 20.

Figure 7:
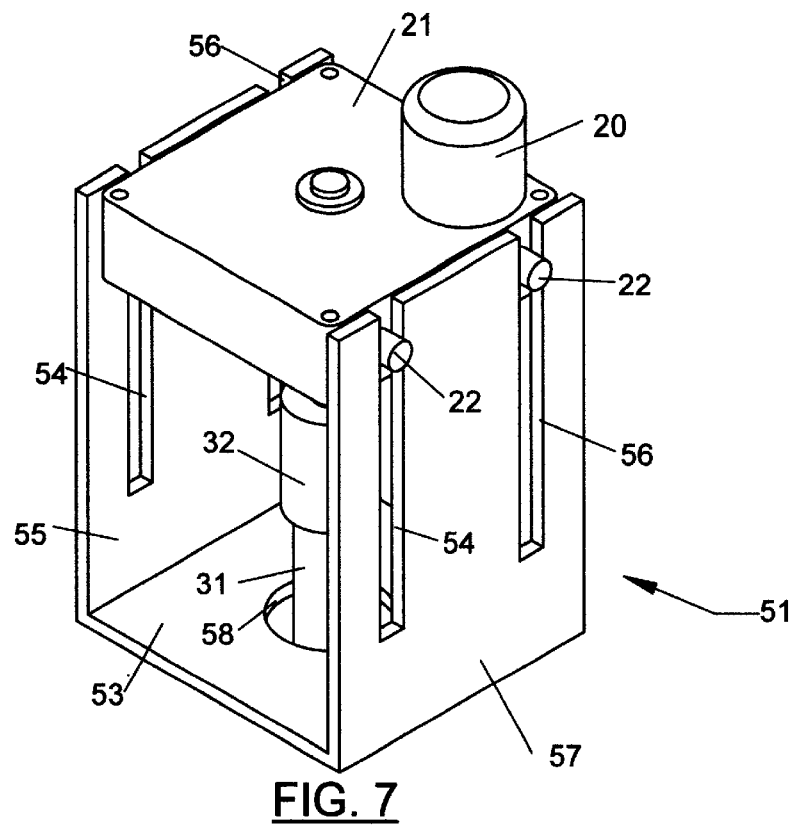
FIG. 7 is an alternative support assembly for the motorized unit of FIG. 2.
Figure 8:
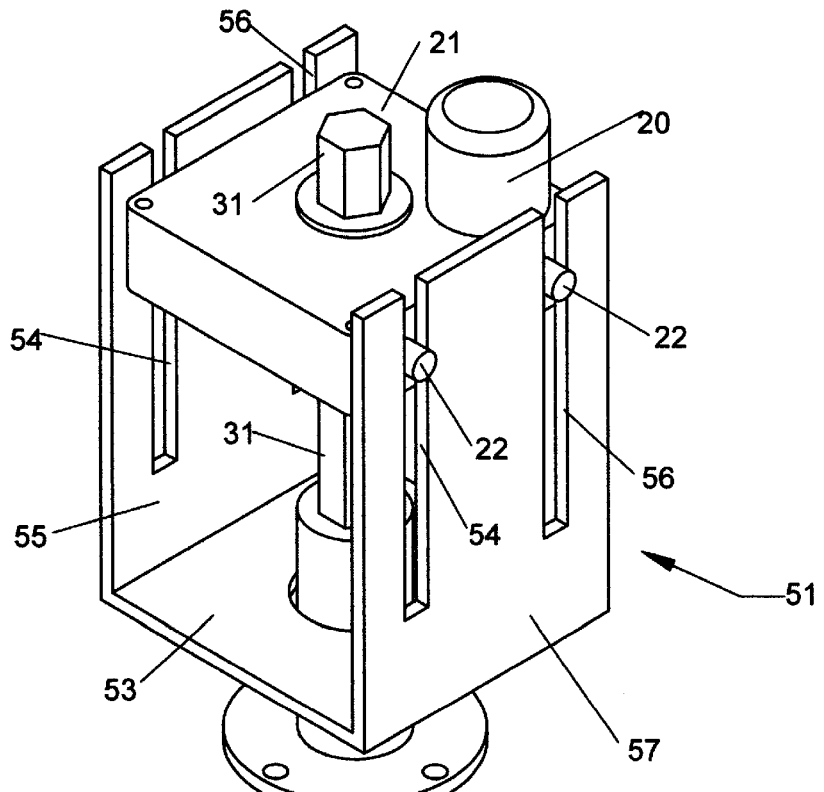
FIG. 8 is an alternative support assembly for the motorized unit of FIG. 4.

An alternative support structure 51 is shown in FIGS. 7 and 8. FIG. 7 shows the motor assembly of FIG. 2 deployed in this support structure; FIG. 8 shows the embodiment of FIG. 4 so deployed. In FIG. 7, gear 28 may be eliminated, and gear 26 replaced by a drive collar 32 that is connected to shaft 25 and which has an opening 29 for fitment directly over screw 31. The illustrations of structure 51 have a box-like configuration; however, support 51 may have any suitable configuration whether rectangular, elliptical, or cylindrical depending on the shape of gear box 21. Support structure 51 has a horizontal lower surface or base 53 having two opposing parallel vertical sides 55 and 57 orthogonally attached thereto. Structure 51 has no top or intermediate sides. A pair of elongated slots 54 and 56 are provided on each of sides 55 and 57. Box 21 is provided with four guide tabs 22, two on each opposite side, which correspond to slots 54 and 56 on each side. An opening 58 is provided in base 53 for receiving screw 31. Base 53 is attached directly to housing 49. Opening 58 may be threaded in order to receive the threaded portion of screw 31.

In FIG. 7, opening 29 of gear 28 is fitted over nut 31, or alternatively collar 32 is fitted directly over screw 31. In FIG. 8, opening 29 in box 21 is fitted directly onto screw 31. In both the embodiments of FIG. 7 and 8, as rotation is imparted to screw 31, box 20 moves up or down inside support structure 51 along with shaft 31, as tabs 22 slide in slots 54 and 56. However, tabs 22 in slots 54 and 56 prevent box 21 itself from rotating, thereby imparting rotational force to nut 31, turning it when motor 20 operates. Support structure 51 may be formed in any suitable configuration in order to accommodate the shape of gear box 21 and to allow box 21 to slide up and down without rotating. As an example, should gear box 21 have a round shape, support structure 51 may be cylindrical in order to allow the round gear box to slide up and down. Tabs 22 would fit into slots 54, 56 in the cylindrical walls in such a configuration.

Figure 9:
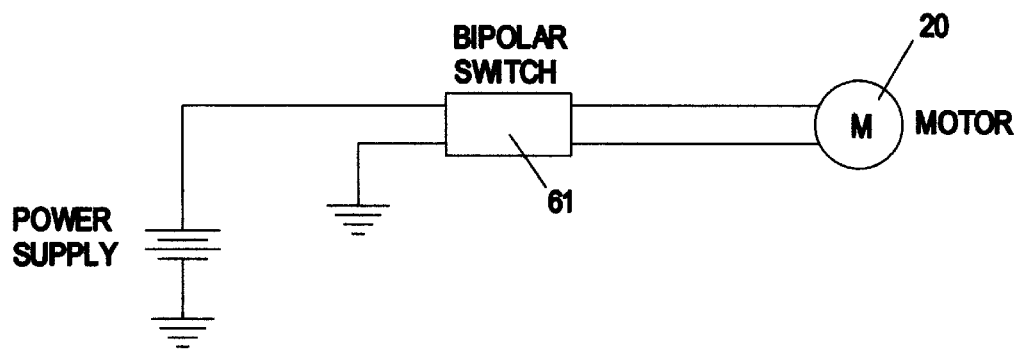
FIG. 9 is a general schematic showing bipolar switch control of a motor of the present invention.
Figure 10:
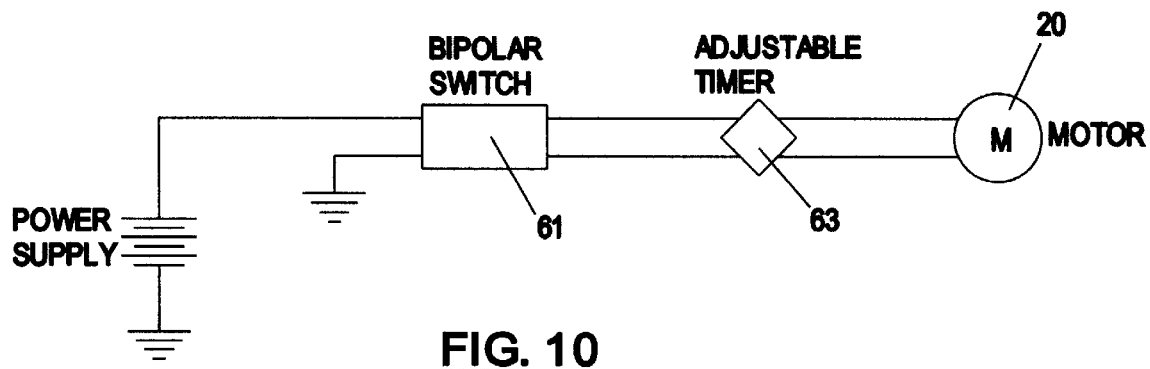
FIG. 10 is a general schematic showing a bipolar switch and adjustable timer in the circuit for controlling a motor of the present invention.
Figure 11:
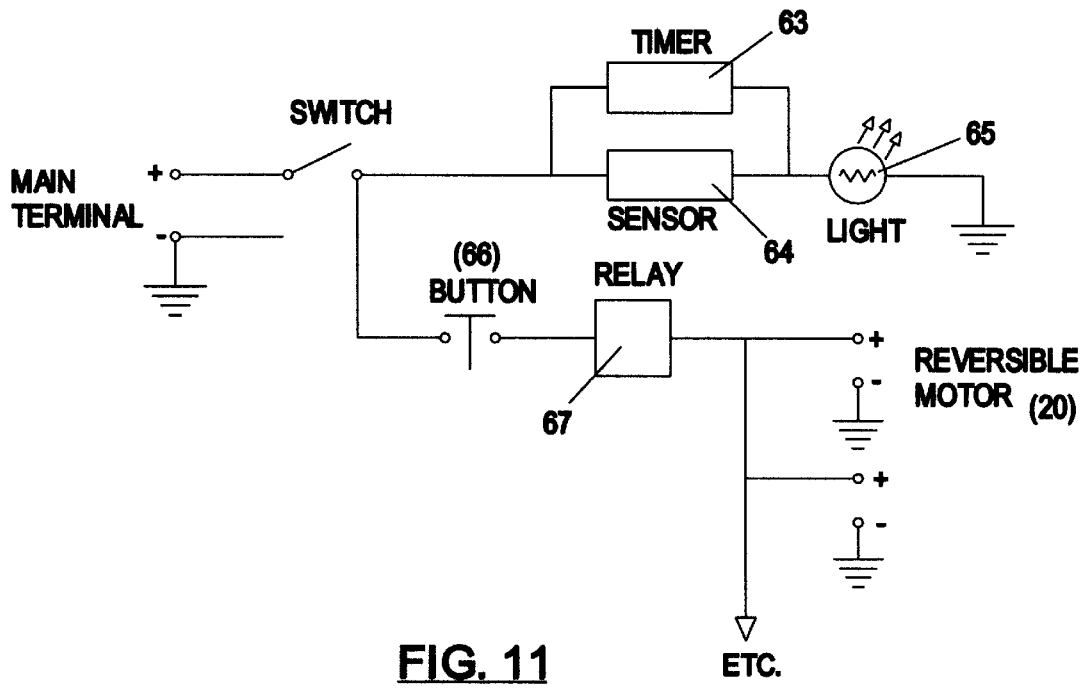
FIG. 11 is a general schematic showing a more elaborate version of the present invention using a timer, sensors and a relay for controlled operation of the motors of the present invention.

It is to be appreciated that more than one doffer adjusting assembly of the present invention may be provided on a given cotton harvesting machine, up to the number of doffer shafts, one for each shaft. Wires 24 extend from each such motor 20 to a power supply controlled by a switch or other means (e.g. microprocessor), preferably in the cab of the harvester. Each motor 20 may be bipolar such that reversing the polarity of the charge delivered over lines 24 reverses the direction of rotation of motor 20. The control for each motor 20 may be as simple as a bi-polar switch 61 (see FIG. 9) which provides a reversible charge to each motor 20 depending upon which selection is made by the user. The control circuitry may also included an adjustable timer 63 which provides energy to each motor 20 for a pre-determined (but adjustable) time period when switch 61 is activated. (see FIG. 10.) This allows the position of each doffer assembly to be adjusted in consistent increments. The controls may by more elaborate, including one or more sensors 64 on the doffer assembly which may either operate a signal light in the cab of the harvester, or provide input to a microprocessor or other controller which automatically adjusts the doffer assemblies according to the input from the sensors. In the schematic of FIG. 11, an input from a sensor 64 or from a timer 63 will cause a light 65 to signal, indicating to the operator that an adjustment of the doffers is appropriate. Then, by pushing a button 66, a relay 67 will cause the doffers adjustment motor(s) to operate for a fixed time interval, making a preset adjustments.

In an alternative embodiment, as backup to the locking motor in order to prevent movement of screw 31 while motor 20 is not operating, a pivotally attached ratchet member (not shown) may be provided in gear box 21 or in the vicinity of gears 26 or 28 which functions to prevent reversal of the motion of screw 31. In such an embodiment, motor 20 would only be able to operate in one direction without opening the doffer assembly to disengage the ratchet.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. A remotely controlled motorized apparatus for adjusting the vertical position of a doffer support shaft of a cotton harvesting machine comprising:
   a. an electric motor;
   b. a power source for said motor;
   c. a switch for controlling when power is delivered to said motor;
   d. a gear box operably associated with said motor;
   e. an operable opening in said gearbox which corresponds with a manual adjustment screw associated with said doffer support shaft for snug fitment over said screw, wherein a collar is provided with said operable opening and a set screw is provided with said collar for securing said collar to said adjustment screw; and
   f. a mount for attaching said gear box over said adjustment screw.

2. A remotely controlled motorized apparatus for adjusting the vertical position of a doffer support shaft of a cotton harvesting machine comprising:
   a. an electric motor;
   b. a power source for said motor;
   c. a switch for controlling when power is delivered to said motor;
   d. a gear box operably associated with said motor;
   e. an operable opening in said gearbox which corresponds with a manual adjustment screw associated with said doffer support shaft for snug fitment over said screw, wherein said motor is capable of locking into a fixed position when not in operation such that said adjustment screw does not move unless said motor is operating; and
   f. a mount for attaching said gear box over said adjustment screw.

3. The apparatus of claim 2 wherein a support structure is provided for said motor and gear box, said structure including a horizontal base for attachment over the doffer adjustment screw, a pair of opposing vertical parallel walls orthogonally attached to said base, each of said walls having at least one elongated vertical slot therein, and wherein said gear box includes a plurality of tabs for slidable placement in said slots.

4. The apparatus of claim 2 wherein a rotatable shaft extends out from said gear box, an intermediate gear is provided at the end of said shaft, and a second gear is provided which intermeshes with said intermediate gear, said second gear having an central opening and a collar attached thereto at said opening, and a set screw is provided with said collar for securing said collar to said adjustment screw.

5. The apparatus of claim 2 wherein a plurality of said apparatus are provided for use on each of the harvesting units of a cotton harvesting machine.

6. The apparatus of claim 2 wherein said motor is capable of imparting rotational motion in either a clockwise or counterclockwise direction, and said control switch is capable of reversing the polarity of the power supplied to said motor.

7. The apparatus of claim 2 wherein at least one sensor is provided in the vicinity of the doffer pads on said support shaft for providing a signal when said doffer pads are worn.

8. The apparatus of claim 7 wherein a plurality of sensors and a plurality of motorized apparatus are provided for use on each of the harvesting units of a cotton harvesting machine.

9. The apparatus of claim 8 wherein a microprocessor is provided for receiving the input from said sensors and providing power to said motors.

10. The apparatus of claim 2 wherein at least one sensor is provided within a housing enclosing said doffer support shaft in the vicinity of the doffer pads for providing a signal when said doffer pads are worn.

11. The apparatus of claim 2 wherein a timer is associated with said doffer support shaft for measuring the length of time that said shaft has been in use.

12. In a cotton harvesting machine of the type having harvesting units, each unit including a rotor having a plurality of vertically spaced rows of rotatable spindles and a corresponding doffer assembly with a manual adjustment screw for adjusting the vertical position of a-doffer support shaft, an apparatus for remotely controlling the position of said doffer support shaft comprising:
   a. an electric motor;
   b. a power source for said motor;
   c. a switch for controlling when power is delivered to said motor;
   d. a gear box operably associated with said motor;
   e. an operable opening in said gearbox which corresponds with a manual adjustment screw associated with said doffer support shaft for snug fitment over said screw wherein a collar is provided with said operable opening and a set screw is provided with said collar for securing said collar to said adjustment screw; and
   f. a mount for attaching said gear box over said adjustment screw.

13. In a cotton harvesting machine of the type having harvesting units, each unit including a rotor having a plurality of vertically spaced rows of rotatable spindles and a corresponding doffer assembly with a manual adjustment screw for adjusting the vertical position of a doffer support shaft, an apparatus for remotely controlling the position of said doffer support shaft comprising:
   a. an electric motor;
   b. a power source for said motor;
   c. a switch for controlling when power is delivered to said motor;
   d. a gear box operably associated with said motor;
   e. an operable opening in said gearbox which corresponds with a manual adjustment screw associated with said doffer support shaft for snug fitment over said screw wherein said motor is capable of locking into a fixed position when not in operation such that said adjustment screw does not move unless said motor is operating; and f. a mount for attaching said gear box over said adjustment screw.

14. The apparatus of claim 13 wherein a support structure is provided for said motor and gear box, said structure including a horizontal base for attachment over the doffer adjustment screw, a pair of opposing vertical parallel walls orthogonally attached to said base, each of said walls having at least one elongated vertical slot therein, and wherein said gear box includes a plurality of tabs for slidable placement in said slots.

15. The apparatus of claim 13 wherein a rotatable shaft extends out from said gear box, an intermediate gear is provided at the end of said shaft, and a second gear is provided which intermeshes with said intermediate gear, said second gear having an central opening and a collar attached thereto at said opening, and a set screw is provided with said collar for securing said collar to said adjustment screw.

16. The apparatus of claim 13 wherein a plurality of said apparatus are provided for use on each of the harvesting units of a cotton harvesting machine.

17. The apparatus of claim 13 wherein said motor is capable of imparting rotational motion in either a clockwise or counterclockwise direction, and said control switch is capable of reversing the polarity of the power supplied to said motor.

18. The apparatus of claim 13 wherein at least one sensor is provided in the vicinity of the doffer pads on said support shaft for providing a signal when said doffer pads are worn.

19. The apparatus of claim 13 wherein a sensor is provided in at least one of said harvesting units for providing a signal when said doffer pads are worn.

20. The apparatus of claim 13 wherein a timer is associated with at least one of said harvesting units for measuring the length of time that said unit has been in operation.

21. A remotely controlled motorized apparatus for adjusting the vertical position of a doffer support shaft of a cotton harvesting machine comprising:

a an electric motor;

b. a power source for said motor;

c. a switch for controlling when power is delivered to said motor;

d. a gear box operably associated with said motor;

e. an operable opening in said gearbox which corresponds with the adjustment mechanism of said doffer support shaft for snug engagement with said mechanism, wherein said motor is capable of locking into a fixed position when not in operation such that said mechanism does not move unless said motor is operating; and f. a mount for attaching said gear box over said mechanism.

22. The apparatus of claim 21 wherein a portion of said mechanism has a polygonal cross section and said opening corresponds with said polygonal portion.

* * * * *

UNITED STATES PATENT AND TRADEMARK OFFICE
CERTIFICATE OF CORRECTION

PATENT NO. : 6,415,589 B1
DATED : July 9, 2002
INVENTOR(S) : Richard J. Yribarren and Travis R. Yribarren It is certified that error appears in the above-identified patent and that said Letters Patent is hereby corrected as shown below:

Title page,
Item [57], ABSTRACT,
Line 3, insert -- in -- between "units" and "a cotton"
Line 5, insert -- , -- after "machines"

Column 4,
Line 10, insert a space between "controlled" and "motorized"
Line 36, delete "a" between "of the" and "doffer"
Line 64, delete the period between "support" and "shaft"

Column 6,
Line 53, replace "harverster" with -- harvester --
Line 63, replace "by" with -- be --

Column 7,
Line 27, add -- . -- after "a"

Column 8,
Line 36, delete the dash between "a" and "doffer"

Signed and Sealed this

Twenty-second Day of June, 2004

JON W. DUDAS
*Acting Director of the United States Patent and Trademark Office*